US007016904B1

(12) United States Patent
Grove et al.

(10) Patent No.: US 7,016,904 B1
(45) Date of Patent: Mar. 21, 2006

(54) METHOD AND SYSTEM FOR RAPID INSERTION OF VARIOUS DATA STREAMS INTO SORTED TREE STRUCTURES

(75) Inventors: Daniel D. Grove, San Jose, CA (US); James Michael O'Connor, Union City, CA (US); Edward Funnekotter, Ottawa (CA)

(73) Assignee: Altera Corporation, San Jose, CA (US)

( * ) Notice: Subject to any disclaimer, the term of this patent is extended or adjusted under 35 U.S.C. 154(b) by 74 days.

(21) Appl. No.: 09/842,387

(22) Filed: Apr. 25, 2001

(51) Int. Cl.
*G06F 17/30* (2006.01)

(52) U.S. Cl. .......................... 707/100; 707/7; 707/102; 707/101; 707/200; 707/201; 707/203

(58) Field of Classification Search .................... 707/1, 707/3, 100, 7, 102, 101, 200, 201, 203
See application file for complete search history.

(56) References Cited

U.S. PATENT DOCUMENTS

| 5,560,006 A | * | 9/1996 | Layden et al. ................. 707/2 |
| 5,926,815 A | * | 7/1999 | James, III ...................... 707/7 |
| 6,480,839 B1 | * | 11/2002 | Whittington et al. .......... 707/3 |

* cited by examiner

Primary Examiner—Cam-Y Truong
(74) Attorney, Agent, or Firm—Martine Penilla & Gencarella, LLP (57) ABSTRACT

The present invention provides the method and system that redistribute the nodes of a sorted tree to enable faster data insertion. Further, the tree typically contains a fixed number of levels, each comprising a fixed number of nodes. Each node in the tree is indexed and each leaf node may comprise a number of data segments. An increment is empirically calculated as space redistributed among non-empty leaf nodes. Furthermore, when a data segment is inserted and certain conditions are met, a data structure with a marked head and tail effectively "traverses" the tree from one end to the other searching for empty leaf nodes. In cases where the data structure encounters an empty leaf node, the data structure continues traversing unless empirically determined conditions stipulate that the process halts until the next data segment insertion before continuing. Moreover, in cases where the data structure encounters a non-empty leaf node, the contents of the node are copied from the head to the tail of the data structure. When the node has been copied, the data structure updates the tree to ensure that a lookup operation on the copied node remains valid and that the invariants of the tree hold before and after the redistribution. Furthermore, the contents in the head of the data structure are then deleted and the tail advanced to leave an increment amount of empty spaces in the traveling direction. The traversal process may then follow one of two possible paths of action: either continue traversing the tree or halt for the next data insertion before continuing.

12 Claims, 13 Drawing Sheets

METHOD AND SYSTEM FOR RAPID INSERTION OF VARIOUS DATA STREAMS INTO SORTED TREE STRUCTURES

FIELD OF INVENTION

The invention relates to the field of computer hardware, and in particular to the rapid insertion of various data streams into sorted tree structures.

BACKGROUND

Figure 1A:
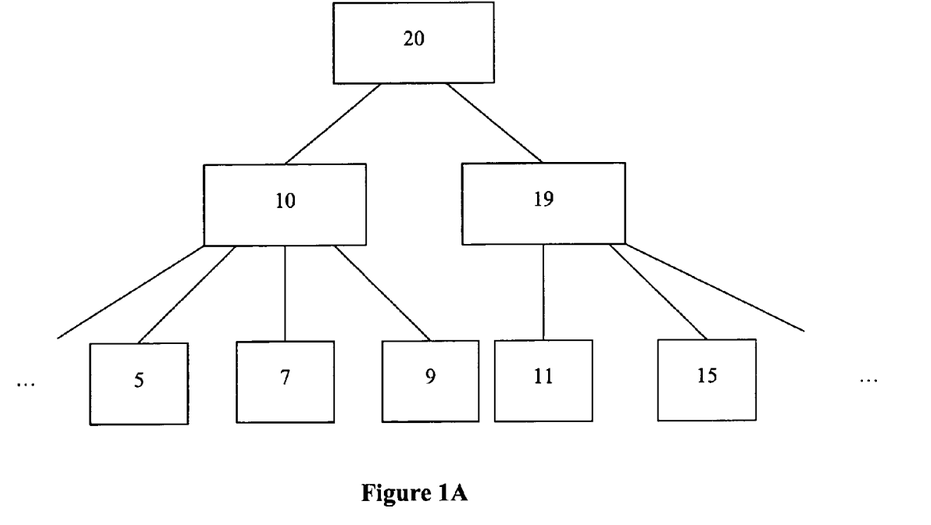
FIG. 1 is a diagram of a sorted tree.
Figure 1B:
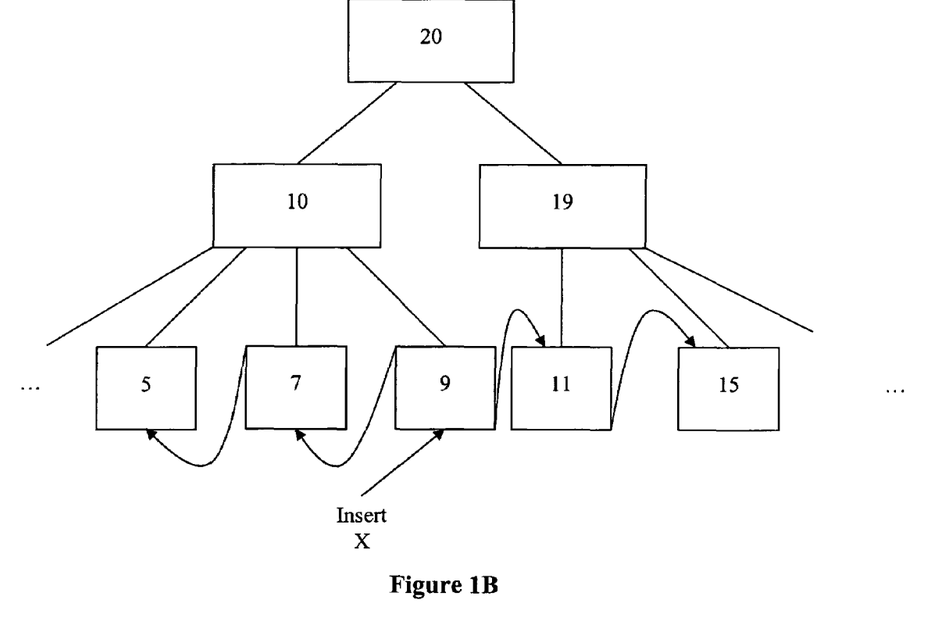

In the design of hardware applications, sorted tree structures are often used to maintain large data structures involving fast lookups. Often, the data segments may be inserted into the tree structure in any order (e.g. sorted, random, reverse-sorted, etc). Furthermore, a hardware tree structure typically encompasses a fixed number of levels each comprising a fixed number of tree nodes. A typical system for maintaining a sorted tree may employ some variant of insertion sort that functions too slowly when a data segment is inserted into filled leaf nodes. Each leaf node contains a number of data segments, and may be filled if it does not contain any unused entries or cannot accommodate an inserted data segment. Moreover, because the number of tree levels is typically fixed, insertion into a filled leaf node may require reconstruction of the entire tree, a process that could be excruciatingly slow for a non-trivial tree structure. For instance, FIG. 1A depicts a sorted tree with a fixed three level tree structure comprising the root node indexed 20, two child nodes indexed 10 and 19, and several leaf nodes indexed 5, 7, 9, 11, 15, etc. FIG. 1B shows a data segment X being inserted into the leaf node indexed 9. Assuming that the leaf nodes 5, 7, 9, 11, and 15 are filled and cannot accept any insertions without reconstruction, the insertion of the data segment X forces the leaf node indexed 9 to either "push" its last data segment into the top of the leaf node indexed 11 or "push" its first data segment into the bottom of the leaf node indexed 7. Moreover, since both leaf nodes indexed 7 or 11 are also filled, more "pushing" would be necessary regardless which direction the leaf node indexed 9 "pushes". The propagated effects of the "pushing" scenario may involve reconstruction on a significant portion of the tree, thereby substantially prolonging the insertion process. The present invention employs a data redistribution scheme that addresses the aforementioned issues.

SUMMARY OF INVENTION

The present invention provides the method and system that redistribute the nodes of a sorted tree to enable faster data insertion. Further, the tree typically contains a fixed number of levels, each comprising a fixed number of nodes. Each node in the tree is indexed and each leaf node may comprise a number of data segments. An increment is empirically calculated as space redistributed among non-empty leaf nodes. Furthermore, when a data segment is inserted and certain conditions are met, a data structure with a marked head and tail effectively "traverses" the tree from one end to the other searching for empty leaf nodes. In cases where the data structure encounters an empty leaf node, the data structure continues traversing unless empirically determined conditions stipulate that the process halts until the next data segment insertion before continuing. Moreover, in cases where the data structure encounters a non-empty leaf node, the contents of the node are copied from the head to the tail of the data structure. When the node has been copied, the data structure updates the tree to ensure that a lookup operation on the copied node remains valid and that the invariants of the tree hold before and after the redistribution. Furthermore, the contents in the head of the data structure are then deleted and the tail advanced to leave an increment amount of empty spaces in the traveling direction. The traversal process may then follow one of two possible paths of action: either continue traversing the tree or halt for the next data insertion before continuing.

DETAILED DESCRIPTION

The present invention provides the method and system that enable the rapid insertion of various data streams into a sorted tree structure. Furthermore, the tree typically encompasses a fixed number of levels each comprising a fixed number of nodes. Each node of the tree is indexed and each leaf node comprises a number of data segments. A leaf node may be filled if it does not contain any unused entries or cannot accommodate an inserted data segment. One significant scenario that impedes rapid insertion of data into a sorted tree occurs when the data segments are inserted into a filled leaf node, which may in turn cause reconstruction of the entire tree. Constant redistribution of empty spaces among the leaf nodes in the present invention significantly reduces the number of filled leaf nodes, thus eliminating the majority of the slow data insertions into filled leaf nodes. Furthermore, the redistribution process decreases the average distance to the nearest non-filled leaf node, thus reducing the impact of the "pushing" scenario in cases where data segments are inserted into a filled leaf node.

The following description is presented to enable one of ordinary skill in the art to make and use the invention and is provided in the context of a patent application and its requirements. Various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 2:
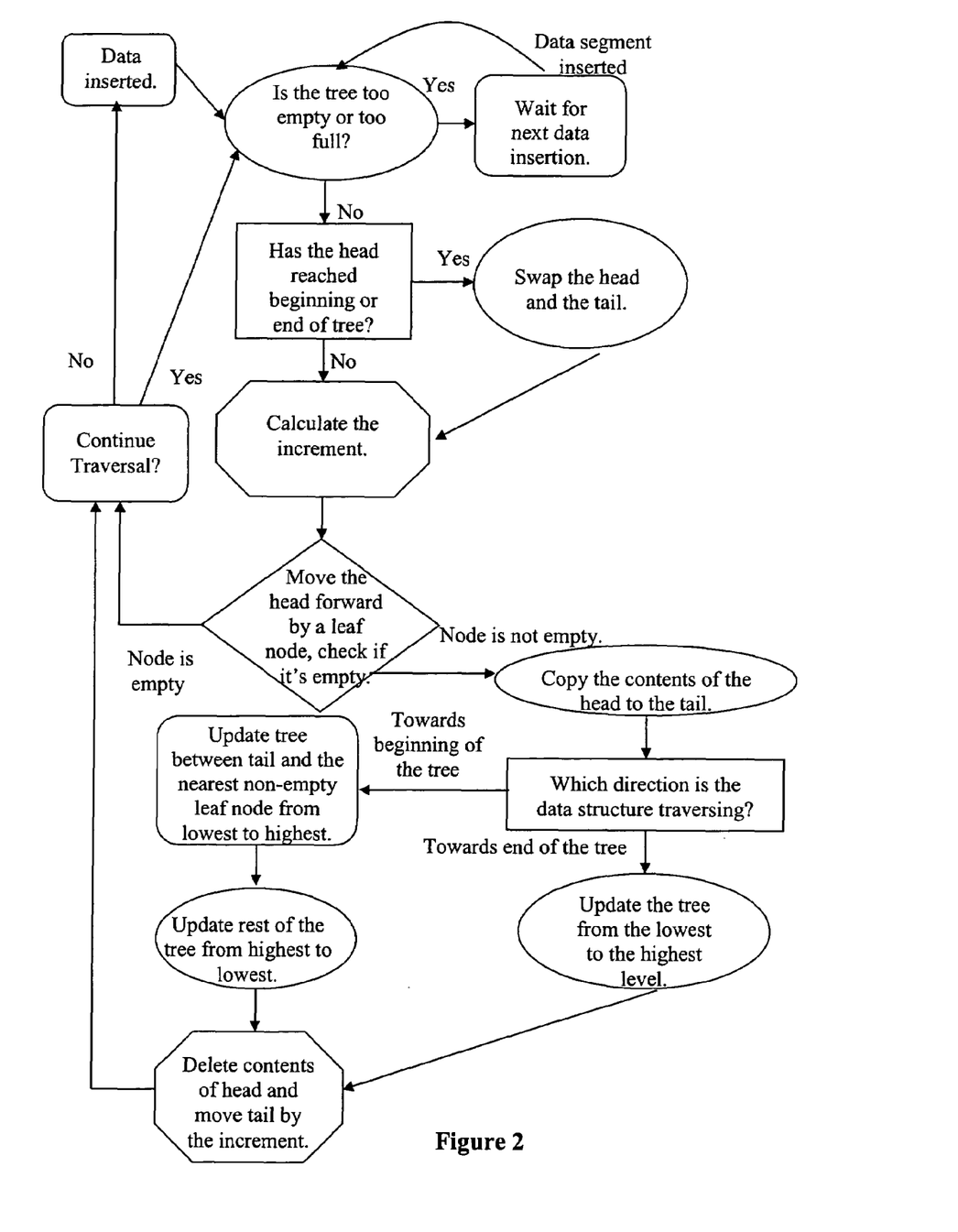
FIG. 2 is a flow diagram of the redistribution process.

One embodiment of the present invention comprises a multi-level N-ary sorted tree with a fixed number of levels each comprising a fixed number of nodes. FIG. 2 illustrates the flow diagram of the data redistribution process in the present invention. The process utilizes a hardware data structure marked by a head and a tail to traverse the tree and redistribute empty spaces among non-empty nodes. As the data structure traverses the tree structure, it is moving in one of two directions in the tree: the first direction points to non-increasing indices and the second direction points to non-decreasing indices. Furthermore, each direction is represented by a logical one or a logical zero to distinguish between the two. The data structure has an empirically calculated length and traverses the tree by moving its head one leaf node towards its traveling direction. Moreover, the traversal typically begins when a data segment is inserted and certain conditions are met. The conditions for traversal require that the tree be neither too occupied nor too vacant. The conditions are stipulated as such because the redistribution scheme is intended to speed up data insertion into filled leaf nodes, however, the benefits of redistribution would diminish where there are very few empty nodes to redistribute (i.e. tree is too occupied) or where the reconstruction of the entire tree is faster than the space redistributions (i.e. tree is too vacant), precise thresholds governing the conditions are empirically determined.

As illustrated in FIG. 2, if the conditions for traversal are not fulfilled when a data segment is inserted, the traversal is put on hold until the next data insertion continues the process. When the conditions for traversal are met, the traversing data structure first checks if its head has reached either end of the tree. If the head of the data structure does contain either end of the tree, the data structure effectively swaps its head and tail and begins to travel in the opposite direction; otherwise, no swapping is necessary.

Moreover, since the present invention enables fast insertion by redistributing the nodes of a sorted tree, an increment amount is calculated to determine the amount of space distributed among non-empty leaf nodes of the tree. As illustrated in FIG. 2, the increment is empirically calculated and may be fractional (e.g. one increment of empty space may be distributed between each 1.5 non-empty nodes) to ensure that the empty spaces are evenly redistributed. Once the increment is calculated, the data structure moves its head one leaf node towards its traveling direction. After the movement, the data structure examines the new contents in the head to determine whether or not the head contains an empty leaf node. If the leaf node is empty, the data structure continues traversing unless empirically determined conditions stipulate that the process halts until the next data segment insertion before continuing.

As illustrated by FIG. 2, if the leaf node in the head is non-empty, the contents of the head are copied into the tail. Furthermore, when the contents in the head of the traversing data structure are copied into the tail, the sorted tree structure is in an unstable transition state where the same node exists in two locations of the tree simultaneously. While in the transition state, the invariants of a sorted tree structure may be disrupted. The illustrated embodiments demonstrate the present invention on sorted N-ary trees, one skilled in the art may adapt the invention to use in combination with other tree structures. A typical sorted N-ary tree structure maintains two invariants while in stable states: 1) the index of a parent node in the tree is greater than or equal to elements in its child node; and 2) the index of a node which is child A of a parent node is greater than or equal to the index of child (A-1) of the parent node. Further, an element lookup operation performed on a typical sorted N-ary tree must find the element if it exists in the tree, regardless of whether the tree is stable. Therefore, in order to maintain the invariant of the sorted tree before and after the transition state, updates of the tree structure may be necessary after the contents of the head are copied into the tail. Moreover, the order in which the tree is updated may be important to ensure consistent lookup operations at all times. The present invention may utilize the traversing data structure for tree updates because the data structure encompasses the indices of leaf nodes between the head and the tail as well as the indices representing the corresponding ancestors of the leaf nodes.

As illustrated in FIG. 2, after copying the head into the tail of the traversing data structure, the process examines the data structure to determine its traveling direction. If the data structure is traveling towards the beginning of the tree, where the head of the data structure travels towards non-increasing indices, the process first updates the tree between the tail and the nearest non-empty leaf node from the lowest tree level to the highest (i.e. from leaf nodes to root), and then updates the remainder of the tree structure from the highest tree level down to the lowest (i.e. from root to leaf nodes).

Figure 3A:
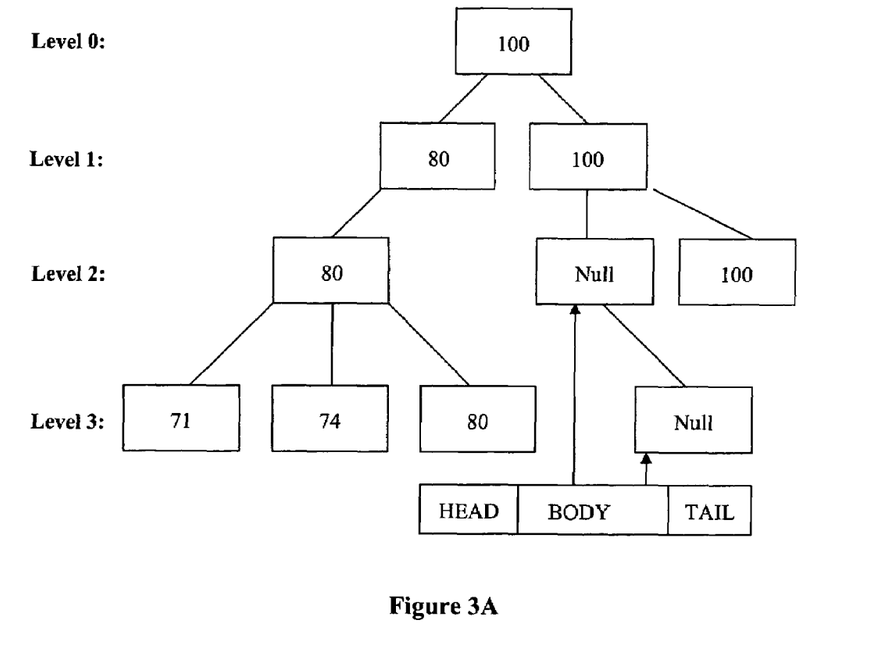
FIG. 3A is a diagram of a sorted tree and a traversing data structure moving towards the beginning (non-increasing indices) of the tree.
Figure 3B:
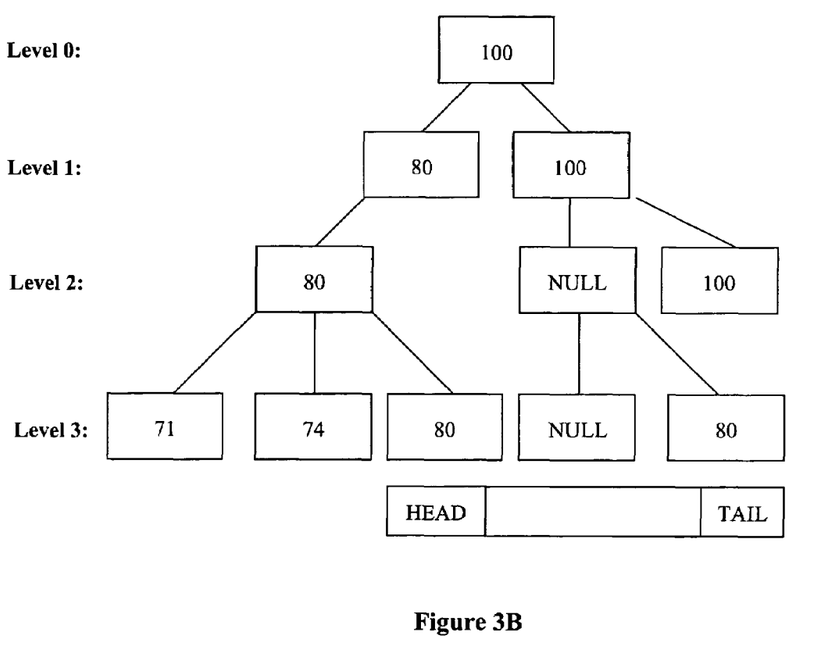
FIG. 3B is a diagram of a leaf node copied from the head to the tail of the data structure.
Figure 3C:
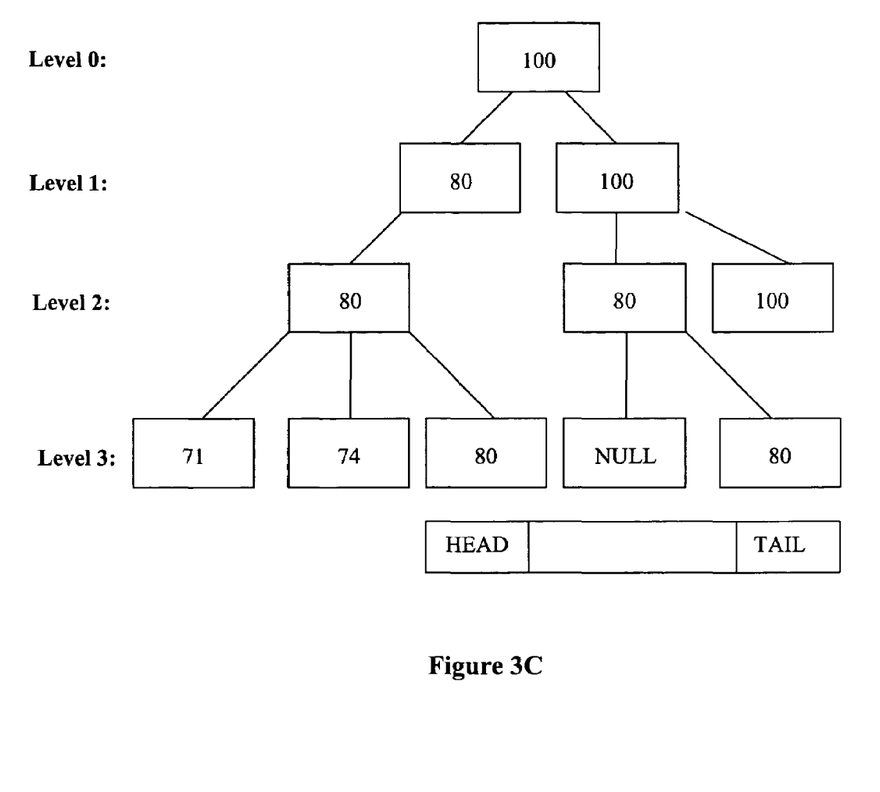
FIG. 3C is a diagram of a sorted tree whose right child is updated from the leaf level to the root level.

FIGS. 3A, 3B, and 3C illustrate one embodiment of the present invention where the contents of the head are copied into the tail and the traveling direction of the data structure is towards the beginning of the tree. FIG. 3A illustrates a sorted tree structure containing a fixed four levels tree structure: level 0 contains the root, level 1 and 2 contain parent nodes, and level 3 contains leaf nodes. The traversing data structure is shown below the tree with its head containing a leaf node index 80 and its tail containing an empty leaf node. The data structure includes a head representing a first pointer to a first leaf node, a tail representing a second pointer to a second leaf node and a body physically adjacent to the head and to the tail, having a set of pointers pointing to contiguous empty nodes. Subsequently, in FIG. 3B, the data structure examines its head and detects that the content is non-empty and thereafter copies the content of the leaf node indexed 80 into the tail. When the node indexed 80 has been copied into the tail, the appropriate ancestors of the new node indexed 80 must also be updated to an index of 80 in order to maintain the invariants of the sorted tree structure. In FIG. 3C, the ancestors of the new node in the tail are shown updated from the node tree level to the root tree level.

Figure 4A:
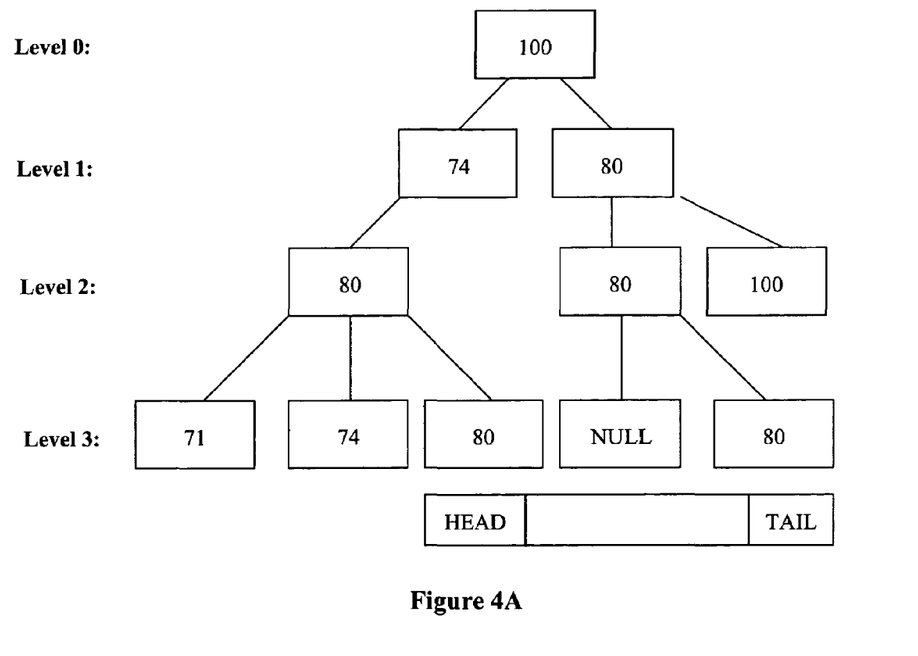
FIG. 4A is a diagram of a sorted tree whose left child is updated in level 1.
Figure 4B:
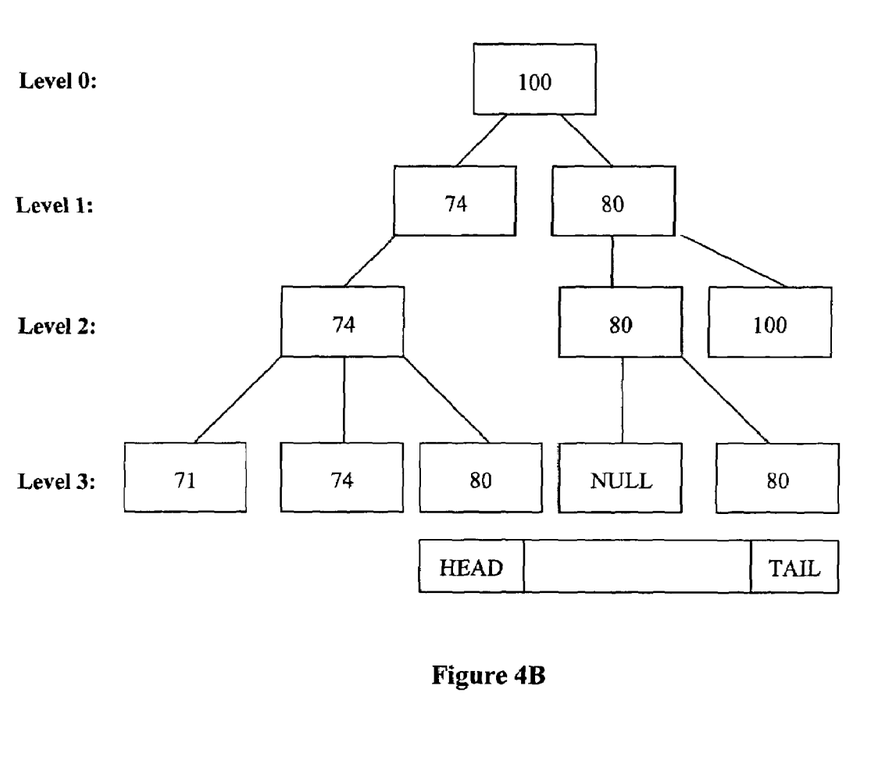
FIG. 4B is a diagram of a sorted tree whose left child is updated in level 2.
Figure 4C:
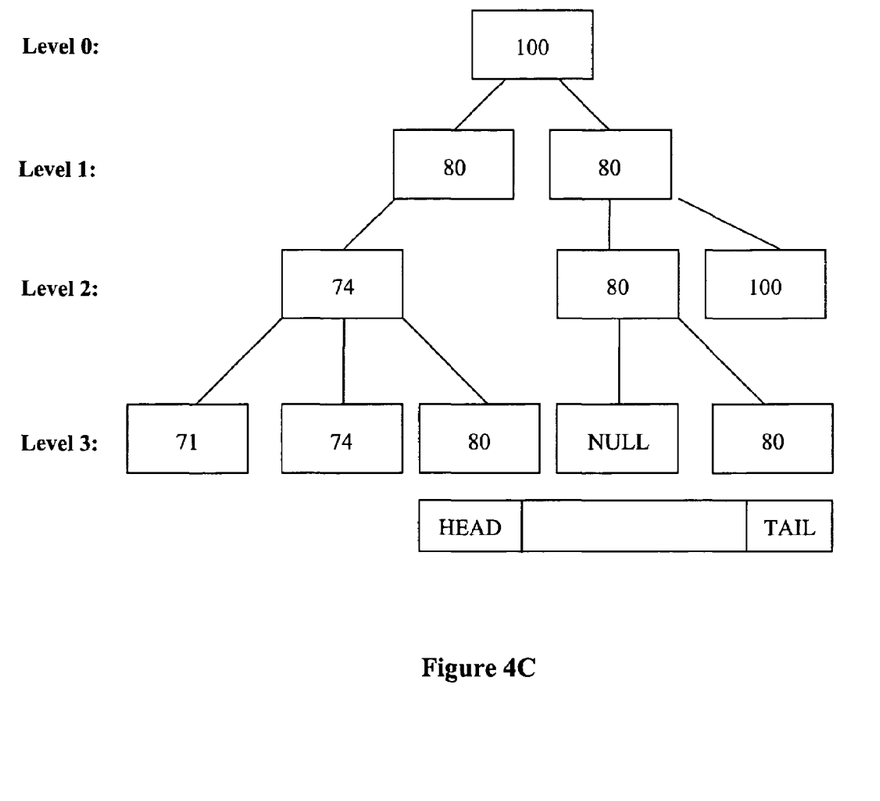
FIG. 4C is a diagram of a sorted tree whose left child is updated from the leaf level to the root level.

FIGS. 4A and 4B illustrate updates for the remainder of the tree shown in FIGS. 3A, 3B, and 3C. Furthermore, as illustrated by FIGS. 4A and 4B, the remainder of the tree is updated from the highest tree level (i.e. root) to the lowest (i.e. leaf nodes) to ensure a consistent lookup result, this order is critical to the success of a lookup operation performed on the copied leaf node. FIG. 4A shows level 1 of the tree being updated to an index of 74 from an index of 80. Subsequently, FIG. 4B shows level 2 of the tree similarly updated to an index of 74. Once the update in FIG. 4A takes effect, any lookup of the leaf node indexed 80 would lead the operation to the copied leaf node in the tail, and the result would be successful. Conversely, if the order of the updates are reversed and are performed from the lowest to the highest level of the tree as shown in FIG. 4C (i.e. level 2 is updated to an index of 74 before level 1), a lookup operation on the leaf node indexed 80 may result in failure. In one embodiment, when a lookup operation on the copied node is performed after level 2 is updated to an index of 74, as shown in FIG. 4C, the operation looks up the left child of the root because it is the first node whose index is greater than or equal to the lookup value (i.e. index 80). Subsequently, the operation looks up the updated level 2 node, since this node is now indexed 74, the operation stops searching because an index of 80 is greater than an index of 74 and thus the operation falsely determined that the value it is searching for cannot be a leaf node under the level 2 node indexed 74. Furthermore, the lookup operation returns a failed result and does not search the root's right child where the new node indexed 80 occupied the tail of the data structure. As shown by the FIGS. 4A, 4B, and 4C, the tree is updated from the highest tree level to the lowest in order to ensure that a lookup on a leaf node indexed 80 is successful as long as it exists in the tree structure.

Figure 5A:
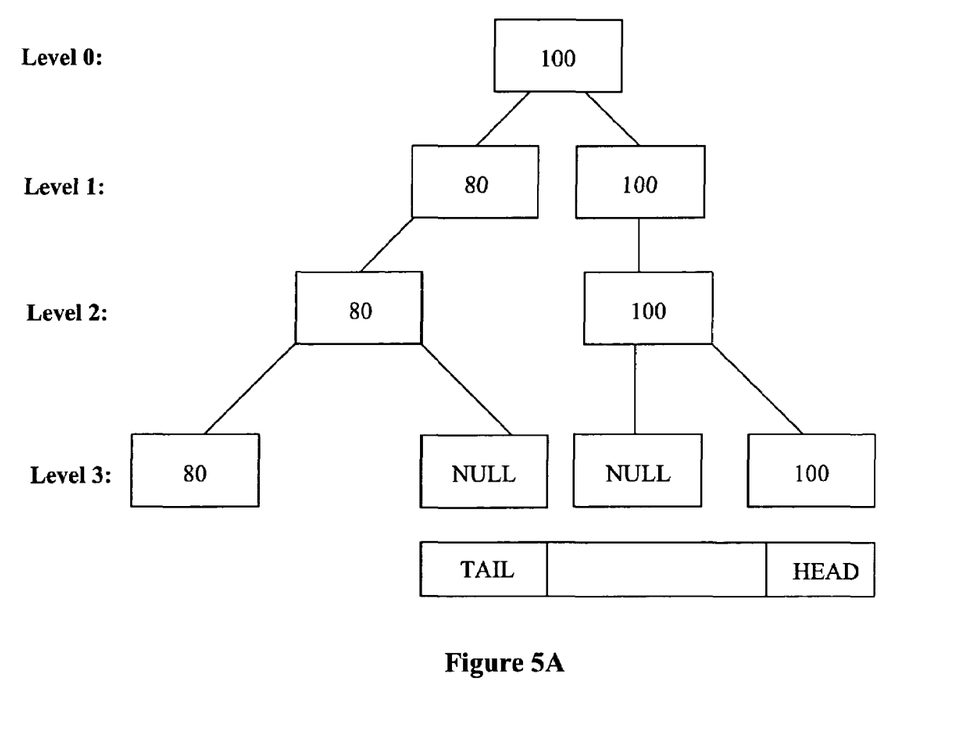
FIG. 5A is a diagram of a sorted tree and a traversing data structure moving towards the end (non-decreasing indices) of the tree.
Figure 5B:
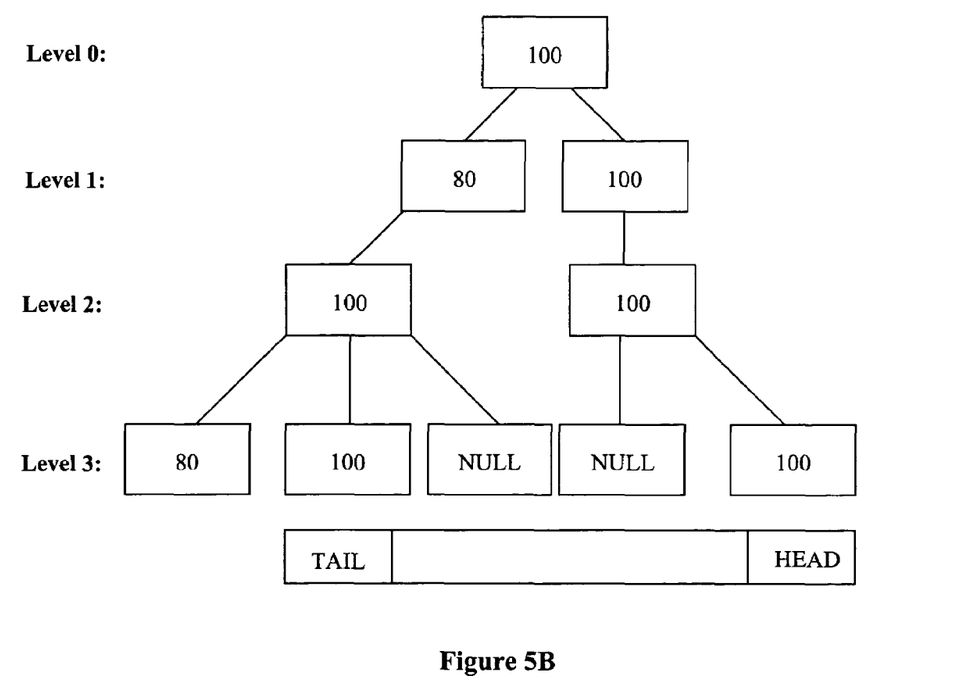
FIG. 5B is a diagram of a sorted tree updated in level 2.
Figure 5C:
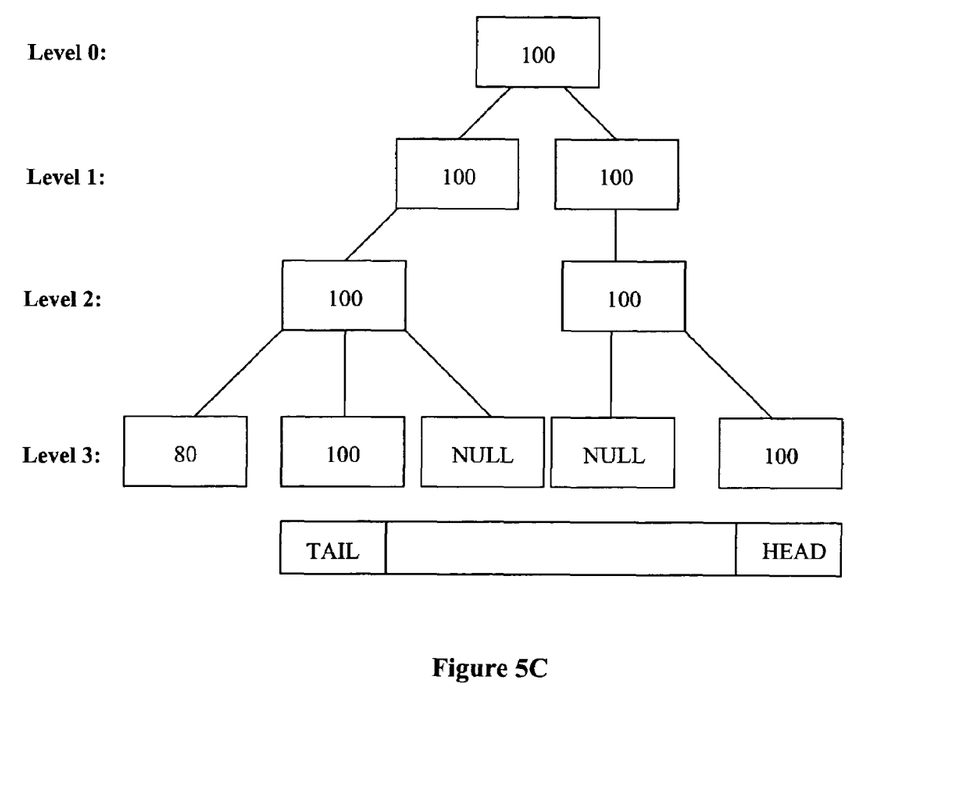
FIG. 5C is a diagram of a sorted tree updated in level 1.
Figure 5D:
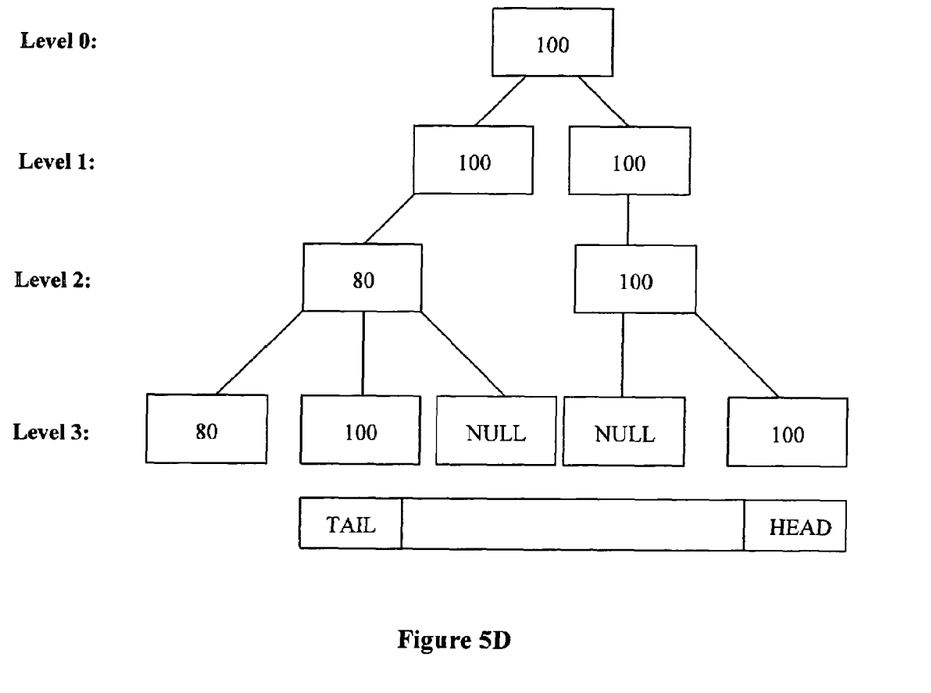
FIG. 5D is a diagram of a sorted tree updated from the root level to the leaf level.

As illustrated in FIG. 2, if the traveling direction of the data structure is towards the end of the tree (i.e. the head is traveling towards non-decreasing indices) when the leaf node is copied from the head to the tail, the tree updates are made from the lowest tree level to the highest (i.e. from leaf to root). FIGS. 5A, 5B, and 5C illustrate the update process of the tree when the traveling direction of the data structure is towards the end. Furthermore, as illustrated by the Figures, the tree is updated from the lowest level (i.e. leaf nodes) to the highest (i.e. root) to ensure a consistent lookup result, this order is critical to the success of a lookup operation of the copied leaf node. FIG. 5A illustrates a sorted tree structure containing four tree levels: level 0 contains the root, level 1 and 2 contain parent nodes, and level 3 contains leaf nodes. The traversing data structure is shown below the tree with its head containing a leaf node index 100 and its tail containing an empty leaf node. Subsequently, the data structure examines its head and detects that the content is non-empty and thereafter copies the content of the leaf node indexed 100 into the tail. FIG. 5B shows the tree where the leaf node indexed 100 resides in both the head and the tail of the traversing data structure and the level 2 node of the left side updated to an index of 100. Subsequently, FIG. 5C shows the level 1 ancestor of the new leaf node similarly updated to an index of 100. After the updates, any lookup operation of the copied leaf node indexed 100 would lead to the original leaf node in the head and would therefore be successful. Conversely, if the ancestors of the newly copied leaf node in the tail are updated in the reversed order from the highest ancestor (i.e. root) to the lowest (i.e. leaf nodes) as shown in FIG. 5D, a lookup operation on the copied leaf node may result in failure. FIG. 5D shows the tree after the leaf node index 100 has been copied and the level 1 instead of level 2 ancestor of the new leaf node is updated to an index of 100. In one embodiment, when a lookup operation is performed on the copied node after level 1 is updated to an index of 100, as shown in FIG. 5D, the operation looks up the left child of the root because it's the first node whose index is greater than or equal to the lookup value (i.e. index 100). Next, the operation looks up the level 2 node, since this node is still indexed 80, the operation stops searching because an index of 100 is greater than an index of 80 and thus the operation falsely determined that the value it is searching for cannot be a leaf node under the level 2 node indexed 80. Furthermore, the lookup operation returns a failed result and does not search the root's right child where the original node indexed 100 is. As shown by the FIGS. 5A, 5B, 5C, and 5D, the tree is updated from the lowest tree level to the highest in order to ensure that a lookup on a leaf node indexed 100 is successful as long as it exists in the tree structure.

FIG. 2 shows that after the tree is updated, regardless what direction the data structure is traveling, the contents contained in the head are deleted, and the tail is moved towards the traveling direction by the pre-calculated increment amount. The head is cleared in order to restore the sorted tree structure back to a stable state where no more than one copy of the same node exist simultaneous, and the tail is moved to redistribute empty spaces among non-empty leaf nodes. Moreover, after the head is cleared and the tail is moved, the redistribution process continues traversing unless empirically determined conditions stipulate that the process halts until the next data segment insertion before continuing.

We claim:

1. A computer implemented method of inserting data segments into a sorted tree structure, comprising:
providing a data structure separate from the sorted tree structure, the data structure having:
a head representing a first pointer to a first leaf node of the sorted tree structure;
a tail representing a second pointer to a second leaf node of the sorted tree structure; and
a body, physically adjacent to the head and to the tail, having a set of pointers pointing to contiguous empty nodes of the sorted tree structure;
the providing of the data structure including:
examining the first leaf node of the sorted tree structure associated with the head of the data structure;
identifying a first leaf node index associated with the head;
copying contents of the first leaf node index from the head to the tail of the data structure;
determining a direction in which the data structure is traversing the sorted tree structure;
updating indices within the sorted tree structure according to an order based upon the direction in which the data structure is traversing the sorted tree structure;
deleting contents of the head when inserting a data segment into the sorted tree structure such that empty spaces are evenly distributed among non-empty leaf nodes;
redistributing the empty spaces among the non-empty leaf nodes by employing the data structure, wherein the redistributing empty spaces maintains a consistent lookup operation on the sorted tree structure.

2. The method of claim 1, wherein the data segments are inserted in any order.

3. The method of claim 1, wherein the sorted tree structure comprises non-leaf and leaf nodes.

4. The method of claim 1, wherein the nodes of the sorted tree structure are indexed.

5. The method of claim 1, wherein each of the first and second leaf nodes comprises a number of data segments.

6. The method of claim 1, wherein the step of redistributing the empty spaces includes traversing the sorted tree structure in one of a first direction and a second direction.

7. The method of claim 6, wherein the first direction is represented by a logical one and the second direction is represented by a logical zero.

8. The method of claim 1, wherein the sorted tree structure is sorted from a bottom of the sorted tree structure to a top of the sorted tree structure.

9. The method of claim 1, further comprising: moving the tail of the data structure according to a pre-calculated increment.

10. The method of claim 1, wherein if the direction in which the data structure is traversing the sorted tree structure is towards a beginning of the tree, then the method includes,
updating the indices between the tail and a nearest non-empty leaf node from a lowest tree level to a highest tree level.

11. The method of claim 10, further comprising:
updating a remainder of the sorted tree structure from the highest tree level to the lowest tree level.

12. The method of claim 1, wherein if the direction in which the data structure is traversing the sorted tree structure is towards an end of the sorted tree structure, then the method includes, updating the indices from a lowest tree level to highest tree level.

* * * * *